(12) United States Patent
Hara

(10) Patent No.: US 7,333,287 B2
(45) Date of Patent: Feb. 19, 2008

(54) HEAD POSITION CONTROL METHOD AND DISK APPARATUS

(75) Inventor: Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/963,073

(22) Filed: Oct. 12, 2004

(65) Prior Publication Data

US 2005/0275964 A1   Dec. 15, 2005

(30) Foreign Application Priority Data

Jun. 9, 2004   (JP) .............................. 2004-171209

(51) Int. Cl.
*G11B 5/596* (2006.01)
(52) U.S. Cl. ...................... 360/77.02; 360/75
(58) Field of Classification Search ...................... None
See application file for complete search history.

(56) References Cited

U.S. PATENT DOCUMENTS

| | | | | |
|---|---|---|---|---|
| 5,905,705 | A * | 5/1999 | Takeda et al. ................. | 360/51 |
| 6,049,440 | A * | 4/2000 | Shu .......................... | 360/77.04 |
| 6,128,153 | A | 10/2000 | Hasegawa et al. | |
| 6,496,322 | B1 | 12/2002 | Hasegawa et al. | |
| 6,704,156 | B1 * | 3/2004 | Baker et al. .................. | 360/75 |
| 6,710,957 | B2 * | 3/2004 | Nakasato ...................... | 360/51 |
| 6,937,420 | B1 * | 8/2005 | McNab et al. ................ | 360/75 |
| 6,950,273 | B2 * | 9/2005 | Nakagawa et al. ...... | 360/78.14 |
| 7,009,802 | B1 * | 3/2006 | Ehrlich ........................ | 360/75 |
| 7,082,008 | B2 * | 7/2006 | Ashikaga et al. ......... | 360/77.04 |
| 2002/0034037 | A1 * | 3/2002 | Kusumoto ............... | 360/77.04 |

FOREIGN PATENT DOCUMENTS

JP   9-330571   12/1997

* cited by examiner

*Primary Examiner*—Andrea Wellington
*Assistant Examiner*—Varsha A. Kapadia
(74) *Attorney, Agent, or Firm*—Greer, Burns & Crain, Ltd.

(57) ABSTRACT

A head position control method controls a position of a head of a first apparatus with respect to a disk which has been formed with a track and has been recorded with servo information including position information in servo frames by a second apparatus that is different from the first apparatus. The method includes measuring an eccentricity of the disk in the first apparatus and calculating a correction value for controlling the head to scan a virtual circular locus approximately matching the track, writing the correction value in a specific servo frame, and controlling the head during a seek, based on the correction value read from the specific servo frame, so that the head scans the virtual circular locus approximately matching the track which has been formed by the second apparatus.

24 Claims, 10 Drawing Sheets

| SERVO PREAMBLE | SM | GrayCode | Fr | PosA | PosB | PosC | PosD | SPD1 | SPD2 |
|---|---|---|---|---|---|---|---|---|---| ns of components within the magnetic disk apparatus. For this reason, the nonvolatile memory that is provided within the magnetic disk apparatus is not always suited for storing the information necessary to correct the eccentricity of the magnetic disk.

HEAD POSITION CONTROL METHOD AND DISK APPARATUS

BACKGROUND OF THE INVENTION

This application claims the benefit of a Japanese Patent Application No. 2004-171209 filed Jun. 9, 2004, in the Japanese Patent Office, the disclosure of which is hereby incorporated by reference.

1. Field of the Invention

The present invention generally relates to head position control methods and disk apparatuses, and more particularly to a disk position control suited for application to a seek that is carried out in a case where a track (or cylinder) prescribed by servo information recorded on a disk is deviated from a circular locus scanned by a head within a disk apparatus loaded with the disk due to eccentricity of the disk, and to a disk apparatus employing such a head position control method.

2. Description of the Related Art

For example, concentric tracks are formed on a magnetic disk that is used in a magnetic disk apparatus such as a hard disk drive (HDD), and each track is sectioned into a plurality of sectors in a peripheral direction of the magnetic disk. Data recording on the magnetic disk is carried out in units of sectors. Servo information includes information (track number) for identifying the track and information (sector number) for identifying the sector, and this servo information is recorded together with the data in the case of the magnetic disk employing a data surface servo system that records both the data and the servo information on the same surface of the magnetic disk.

Conventionally, the forming of the track and the recording of the servo information are carried out in a state where the magnetic disk is loaded into the magnetic disk apparatus. This recording of the servo information on the magnetic disk is also sometimes referred to as a self-Servo Track Writer (self-STW). For this reason, the tracks are formed concentrically about a rotary axis of the magnetic disk. However, when forming the track on the magnetic disk, the magnetic disk and the magnetic head vibrate, and the track does not become a true circle due to the vibration. Accordingly, there is a possibility that mutually adjacent tracks will interfere with each other due to the vibration, and there is a limit to reducing the track pitch, thereby making it difficult to improve the recording density of the magnetic disk. Moreover, since the servo information is recorded with respect to the magnetic disk that has been loaded into each magnetic disk apparatus, it is difficult to improve the productivity.

On the other hand, the Servo Track Writer (STW), which is a high-precision apparatus exclusively for writing, is recently used for forming the track and recording the servo information with respect to the magnetic disk. The STW forms the track and records the servo information with respect to a large number of magnetic disks, and each magnetic disk formed with the track and recorded with the servo information is then loaded into the individual magnetic disk apparatus. By use of the STW, it is possible to reduce the track pitch and improve the recording density of the magnetic disk. In addition, since the forming of the track and the recording of the servo information are carried out with respect to the large number of magnetic disks by the STW, the productivity can also be improved. Recording the servo information on the magnetic disks in such a manner by use of the STW is sometimes also referred to as "stack STW", and in the following description, an apparatus which carries out the stack STW will be referred to as a "stack STW".

But when using the stack STW, the track is formed about the rotary axis of the magnetic disk within the stack STW. Hence, when the magnetic disk is loaded into the magnetic disk apparatus, the center of the track does not completely match the rotary axis of the magnetic disk within the magnetic disk apparatus, and eccentricity occurs. This eccentricity mainly includes a first order component that is generated due to the difference between the center of rotation of the magnetic disk within the STW and the center of rotation of the same magnetic disk within the magnetic disk apparatus, but also includes high order components. For this reason, when carrying out a seek in the magnetic disk apparatus, it is necessary to control the position of the magnetic head so as to scan a virtual circular locus approximately matching the track, by carrying out a correction that follows and corrects the eccentricity or neglects the eccentricity.

It is possible to control the position of the magnetic head while measuring an amount of the eccentricity and a phase of the eccentricity (angular direction of the eccentricity), but in this case, a high-speed computation process must be performed to calculate a correction quantity from the amount and the phase of the eccentricity, and the amount of the eccentricity may greatly change temporarily due to shock applied to the magnetic disk apparatus or the like. Consequently, such a real-time control has a slow response and is unsuited for a high-speed seek.

The measurement of the amount and the phase of the eccentricity may be carried out in a state where the magnetic disk is loaded into the magnetic disk apparatus, as one kind of tuning that is carried out when shipping the magnetic disk apparatus, for example. A Japanese Laid-Open Patent Application No. 9-330571 proposes storing the amount and the phase of the eccentricity measured at the time of the tuning or, the correction quantity that is calculated from the amount and the phase of the measured eccentricity, in a nonvolatile memory within the magnetic disk apparatus, and controlling the position of the magnetic head during the seek based on the stored amount and phase of the eccentricity or the stored correction quantity. When controlling the position of the magnetic head during the seek based on the amount and the phase of the eccentricity or the correction quantity stored in the nonvolatile memory, the position of the magnetic head is first fixed so as to access a specific track (or cylinder) on the magnetic disk. Based on the servo information read from the specific track (or cylinder), the amount and the phase of the eccentricity or the correction quantity corresponding to the track number and the sector number within the servo information are read from the nonvolatile memory. The eccentricity of the magnetic disk within the magnetic disk apparatus is corrected based on the correction quantity that is calculated from the read amount and phase of the eccentricity or from the read correction quantity, by controlling the position of the magnetic head so as to scan a virtual circular locus approximately matching the track.

However, when storing the amount and phase of the eccentricity or the correction quantity in the nonvolatile memory within the magnetic disk apparatus, the cost of the magnetic disk apparatus increases by an amount required to provide the nonvolatile memory within the magnetic disk apparatus. In addition, when the nonvolatile memory is mounted on a Printed Circuit Board (PCB), the information necessary to correct the eccentricity of the magnetic disk is lost if the PCB is replaced due to a failure or the like of other parts mounted on the PCB. Because the information necessary to correct the eccentricity of the magnetic disk differs for each individual magnetic disk apparatus, if the PCB is replaced by a new PCB, it becomes necessary to again measure the amount and phase of the eccentricity or, calculate the correction quantity therefrom, and to store the amount and phase of the eccentricity or the calculated correction quantity into the nonvolatile memory of the new PCB.

SUMMARY OF THE INVENTION

Accordingly, it is a general object of the present invention to provide a novel and useful head position control method and disk apparatus, in which the problems described above are suppressed.

Another and more specific object of the present invention is to provide a head position control method and a disk apparatus, which do not require in the disk apparatus a memory exclusively for storing information that is used to correct eccentricity of a disk, and are capable of controlling a position of a head so as to scan a virtual circular locus approximately matching a track, without considerably deteriorating a surface density of data on the disk.

Still another object of the present invention is to provide a head position control method for controlling a position of a head of a first apparatus with respect to a disk which has been formed with a track and has been recorded with servo information including position information in servo frames by a second apparatus that is different from the first apparatus, comprising the steps of (a) measuring an eccentricity of the disk in the first apparatus and calculating a correction value for controlling the head to scan a virtual circular locus approximately matching the track; (b) writing the correction value in a specific servo frame; and (c) controlling the head during a seek, based on the correction value read from the specific servo frame, so that the head scans the virtual circular locus approximately matching the track which has been formed by the second apparatus. According to the head position control method of the present invention, it is unnecessary to provide in the disk apparatus a memory exclusively for storing information that is used to correct eccentricity of the disk, and it is possible to control the position of the head so as to scan the virtual circular locus approximately matching the track, without considerably deteriorating a surface density of data on the disk.

A further object of the present invention is to provide a head position control method for controlling a position of a head of a first apparatus with respect to a disk which has been formed with a track and has been recorded with servo information including position information in servo frames by a second apparatus that is different from the first apparatus, comprising the steps of (a) measuring an eccentricity of the disk in the first apparatus and calculating a correction value for controlling the head to scan a virtual circular locus approximately matching the track; (b) writing the correction value in a specific System Area (SA) track within a System Area (SA) that is non-accessible by a user; and (c) controlling the head during a seek, based on the correction value read from the specific System Area (SA) track, so that the head scans the virtual circular locus approximately matching the track which has been formed by the second apparatus. According to the head position control method of the present invention, it is unnecessary to provide in the disk apparatus a memory exclusively for storing information that is used to correct eccentricity of the disk, and it is possible to control the position of the head so as to scan the virtual circular locus approximately matching the track, without considerably deteriorating a surface density of data on the disk.

Another object of the present invention is to provide a disk apparatus operable with a disk which is formed with a track and is recorded with servo information including position information in servo frames, comprising a head configured to read and write information with respect to the disk; a correction value acquiring unit configured to measure an eccentricity of the disk and to calculate a correction value for controlling the head to scan a virtual circular locus approximately matching the track; a write unit configured to write the correction value in a specific servo frame by supplying the correction value to the head; and a control unit configured to control the head during a seek, based on the correction value read from the specific servo frame, so that the head scans the virtual circular locus approximately matching the track. According to the disk apparatus of the present invention, it is unnecessary to provide in the disk apparatus a memory exclusively for storing information that is used to correct eccentricity of the disk, and it is possible to control the position of the head so as to scan the virtual circular locus approximately matching the track, without considerably deteriorating a surface density of data on the disk.

Still another object of the present invention is to provide a disk apparatus operable with a disk which is formed with a track and is recorded with servo information including position information in servo frames, comprising a head configured to read and write information with respect to the disk; a correction value acquiring unit configured to measure an eccentricity of the disk and to calculate a correction value for controlling the head to scan a virtual circular locus approximately matching the track; a write unit configured to write the correction value in a specific System Area (SA) track within a System Area (SA) that is non-accessible by a user by supplying the correction value to the head; and a control unit configured to control the head during a seek, based on the correction value read from the specific System Area (SA) track, so that the head scans the virtual circular locus approximately matching the track. According to the disk apparatus of the present invention, it is unnecessary to provide in the disk apparatus a memory exclusively for storing information that is used to correct eccentricity of the disk, and it is possible to control the position of the head so as to scan the virtual circular locus approximately matching the track, without considerably deteriorating a surface density of data on the disk.

Other objects and further features of the present invention will be apparent from the following detailed description when read in conjunction with the accompanying drawings.

DESCRIPTION OF THE PREFERRED EMBODIMENTS

It is conceivable to write information for correcting eccentricity of a magnetic disk on the magnetic disk itself, instead of in a memory within a magnetic disk apparatus. However, the information for correcting the eccentricity of the magnetic disk is essential to control a position of a magnetic head during a seek so as to scan a virtual circular locus that approximately matches an STW track that has been formed by a stack STW. For this reason, a track (or cylinder) that is formed in the magnetic disk apparatus and is written with the information for correcting the eccentricity of the magnetic disk must not overlap a user track (or cylinder) that has been formed by the stack STW, and those user tracks (or cylinders) that have a possibility of overlapping with the track (or cylinder) that is written with the information for correcting the eccentricity of the magnetic disk must be recognized as being non-usable and skipped. The number of user tracks (or cylinders) that need to be skipped is determined by the amount of servo information written by the stack STW, the amount of information for correcting the eccentricity of the magnetic disk, and the size of the virtual circular scanning locus or the amount of eccentricity. Furthermore, the size of the virtual circular scanning locus and the amount of eccentricity differ for each magnetic disk apparatus, and differs for each magnetic disk in the case of a magnetic disk apparatus provided with a plurality of magnetic disks. Therefore, even if the amount of the servo information written by the stack STW and the amount of information for correcting the eccentricity of the magnetic disk are fixed, the number of user tracks (or cylinders) to be skipped will becomes different for each magnetic disk apparatus, and this conceivable method is undesirable in that performances of the magnetic disk apparatuses will be inconsistent.

The magnetic disk apparatus cannot operate normally if the servo information written by the stack STW and the information for correcting the eccentricity of the magnetic disk cannot be read. In other words, a user area made up of the user tracks (or cylinders) becomes accessible only when the servo information and the information for correcting the eccentricity can be read. Accordingly, it is desirable to write the servo information and the information for correcting the eccentricity a plurality of times, but in this case, the region which cannot be used as the user tracks (or cylinders) will further increase, to thereby deteriorate the performance of the magnetic disk apparatus.

Figure 1:
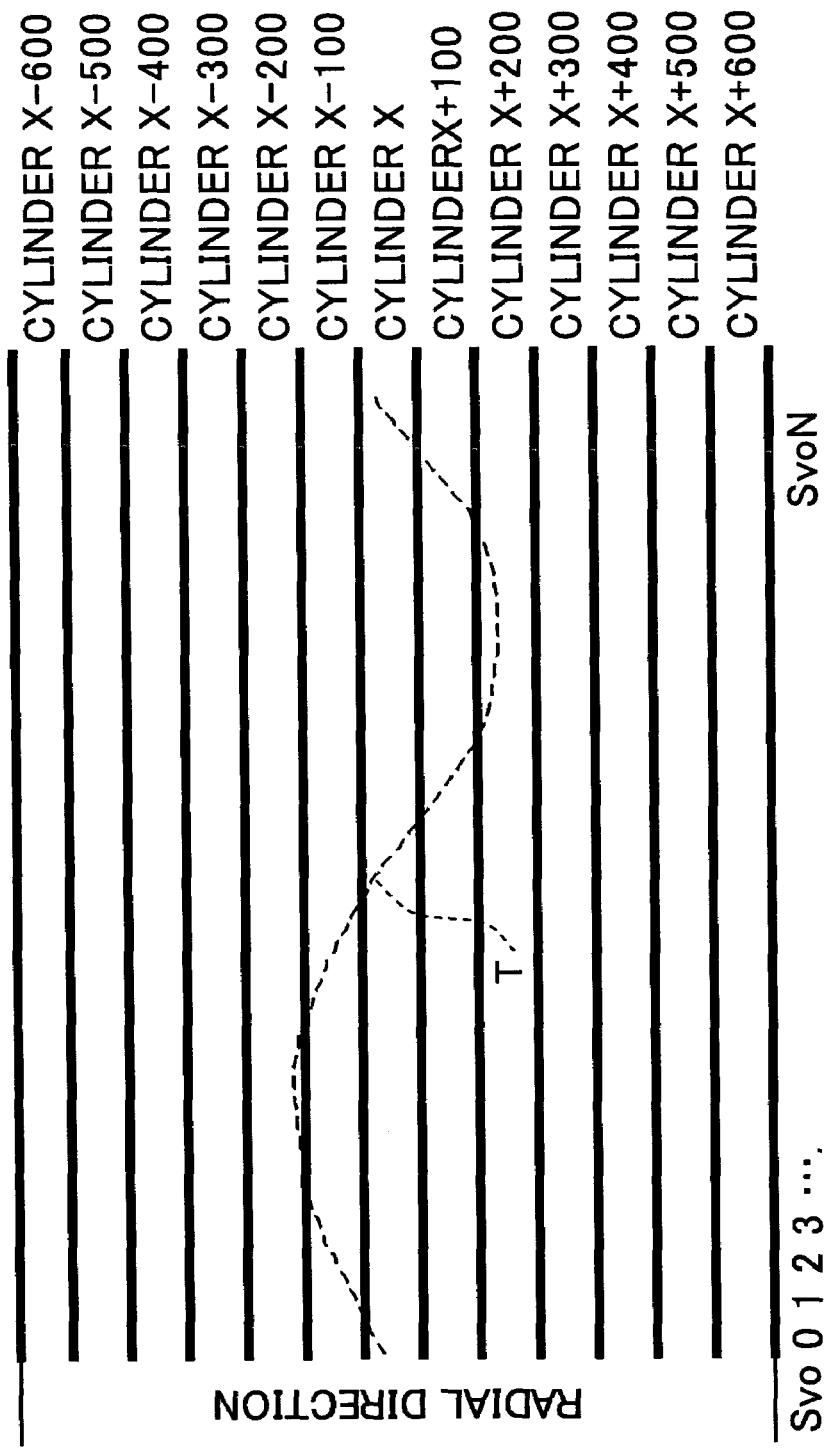
FIG. 1 is a diagram for explaining a relationship of an STW track and a track formed by a magnetic disk apparatus.

FIG. 1 is a diagram for explaining a relationship of an STW track and a track formed by a magnetic head of a magnetic disk apparatus. In FIG. 1, the ordinate indicates STW cylinder numbers (or track numbers) and corresponds to a radial direction of a magnetic disk 10, and the abscissa indicates servo frame numbers Svo0, Svo1, . . . , SvoN. In addition, a dotted line T indicates a cylinder (or track) formed on the magnetic disk 10 by the magnetic head when recording the information for correcting the eccentricity, and bold solid lines indicate STW cylinders (or tracks) by horizontal straight lines for the sake of convenience. In FIG. 1, it is assumed for the sake of convenience that a center of the STW cylinders (or tracks) and a center of the cylinders (or tracks) formed by the magnetic head of the magnetic disk apparatus are deviated by approximately 100 cylinders (or tracks). In addition, the cylinder (or track) T is shown by only taking into consideration a first order component of the eccentricity. In this case, the deviation of the cylinder (or track) T with respect to an STW cylinder (or track) X is approximately the cylinder (or track) X±100 by extending across the cylinder (or track) X. Hence, the cylinder (or track) X−100 to the cylinder (or track) X+100 need to be skipped as a System Area (SA) that is non-usable by a user. Normally, various information related to the magnetic disk is recorded in the SA.

Accordingly, if the information for correcting the eccentricity of the magnetic disk is merely recorded in the magnetic disk in the magnetic disk apparatus, the SA that is non-usable by the user increase on the magnetic disk, to thereby reduce the area usable by the user on the magnetic disk. As a result, the performance of the magnetic disk apparatus deteriorates, and inconsistencies are generated in the performances of the individual magnetic disk apparatuses.

The present invention eliminates the inconveniences of the conceivable method described above, without having to provide in the disk apparatus a memory exclusively for storing information that is used to correct eccentricity of a disk, and is capable of controlling a position of a head so as to scan a virtual circular locus approximately matching a track, without considerably deteriorating a surface density of data on the disk, so that a high-speed access is possible to a desired position on the disk. More particularly, the information for correcting the eccentricity of the disk is recorded in a Servo Post Data (SPD) part on the disk, and the position of the head is controlled so as to scan the virtual circular locus from a time when the SPD part can be read. Since the access is made by controlling the position of the head so as to scan the virtual circular locus from the first SA, it is possible to minimize the number of tracks (or cylinders) on the disk that are non-usable by the user. In addition, because the position of the head is controlled from the start based on information peculiar (or unique) to the disk apparatus, the number of user tracks (or cylinders) to be skipped will not differ for each disk apparatus.

Moreover, even when providing multiple SAs, the information for correcting the eccentricity of the disk is recorded in the SPD part, and thus, a number of tracks (or cylinders) corresponding to the SPD part simply needs to be added to the number of user tracks (or cylinders) that are to be skipped. In other words, the number of user tracks (or cylinders) to be skipped will not increase considerably by providing multiple SAs.

The variation caused by the eccentricity and the like of the disk repeats in a similar manner with a period amounting to one revolution of the disk, and is often referred to as a Repeatable Run Out (RRO). Conventionally, the SPD part records information for suppressing the RRO, and no problems are introduced even if the information for correcting the eccentricity of the disk is recorded in a specific SPD part as done in the present invention.

On the other hand, there is a conventional technique called defect registration that registers defects, such as damaged portions on the disk, in units of sectors. A defective sector that is registered in the SA by the defect registration is not treated as a user sector. Accordingly, of the tracks (or cylinders) that have been formed by the stack STW, the user sector which has a possibility of overlapping with the sector that is written with the information for correcting the eccentricity of the disk may be registered as a defective sector by the defect registration, so that it is possible to positively protect the region that is non-usable by the user and minimize such a non-usable region.

Next, a description will be given of embodiments of a head position control method according to the present invention, a disk apparatus according to the present invention and a disk according to the present invention, by referring to FIG. 2 and the subsequent drawings.

Figure 2:
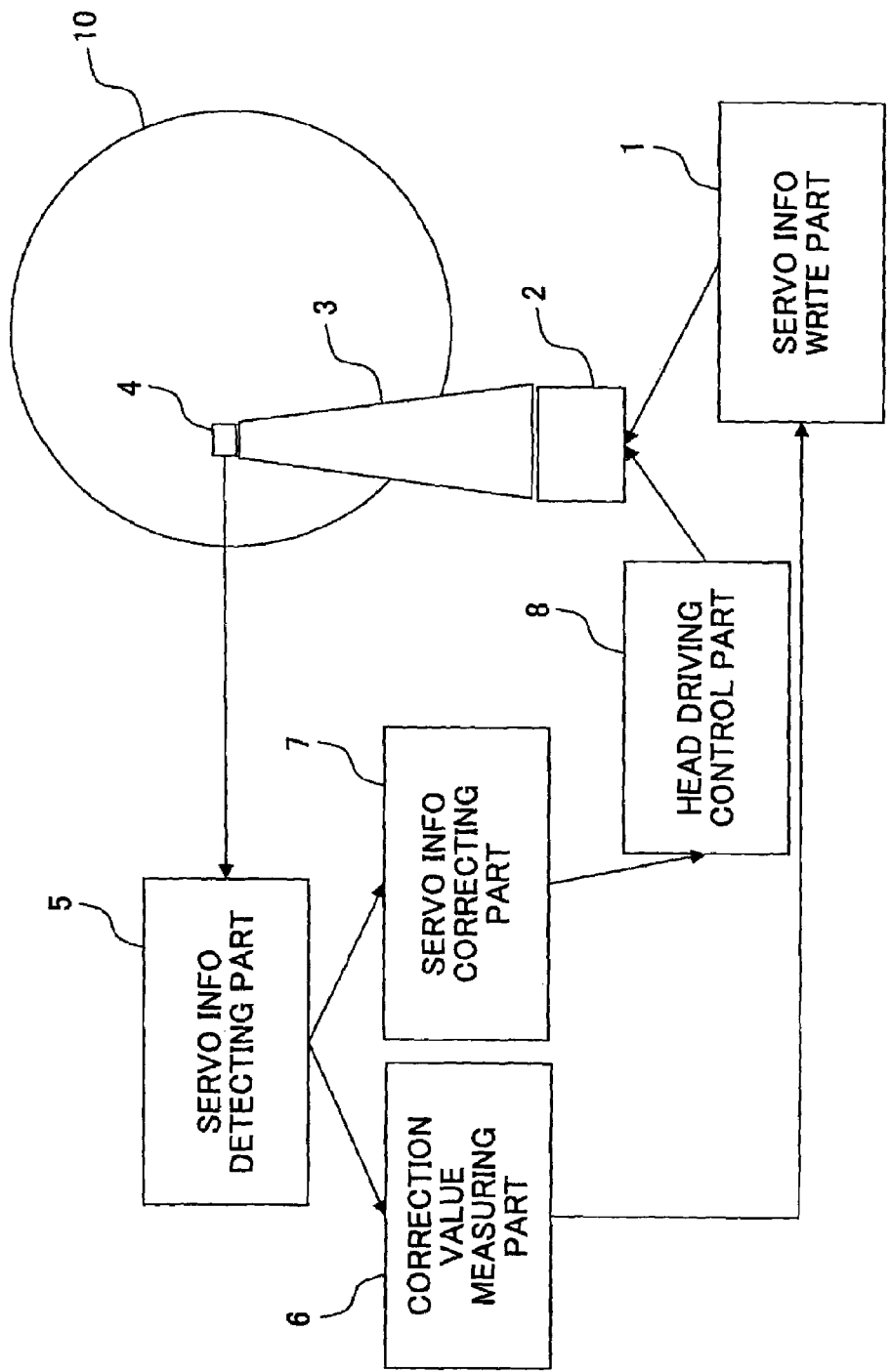
FIG. 2 is a system block diagram showing an important part of a first embodiment of a disk apparatus according to the present invention.

FIG. 2 is a system block diagram showing an important part of a first embodiment of the disk apparatus according to the present invention. This first embodiment of the disk apparatus employs a first embodiment of the head position control method according to the present invention. In this embodiment, the present invention is applied to a magnetic disk apparatus. In addition, this embodiment for the sake of convenience employs the data surface servo system that records both the data and the servo information on the same surface of the magnetic disk.

The magnetic disk apparatus shown in FIG. 2 includes a servo information write part 1, an actuator 2, an arm 3, a magnetic head 4, a servo information detecting part 5, a servo information correction value measuring part 6, a servo information correcting part 7, and a head driving control part 8. In FIG. 2, the illustration of a known processor such as a CPU for controlling the entire operation of the magnetic disk apparatus will be omitted. The correction value measuring part 6 operates, that is, becomes active, only during a predetermined operation mode in which the information for correcting the eccentricity of a magnetic disk 10 is written on the magnetic disk 10, such as when carrying out a tuning operation, an initializing operation or the like. The servo information correcting part 7 also operates, that is, becomes active, during this predetermined operation mode. On the other hand, during a normal operation mode, such as during a seek operation when an access is made to the magnetic disk 10, the servo information correcting part 7 operates, that is, becomes active, but the correction value measuring part 6 does not operate, that is, becomes inactive.

Figure 3:
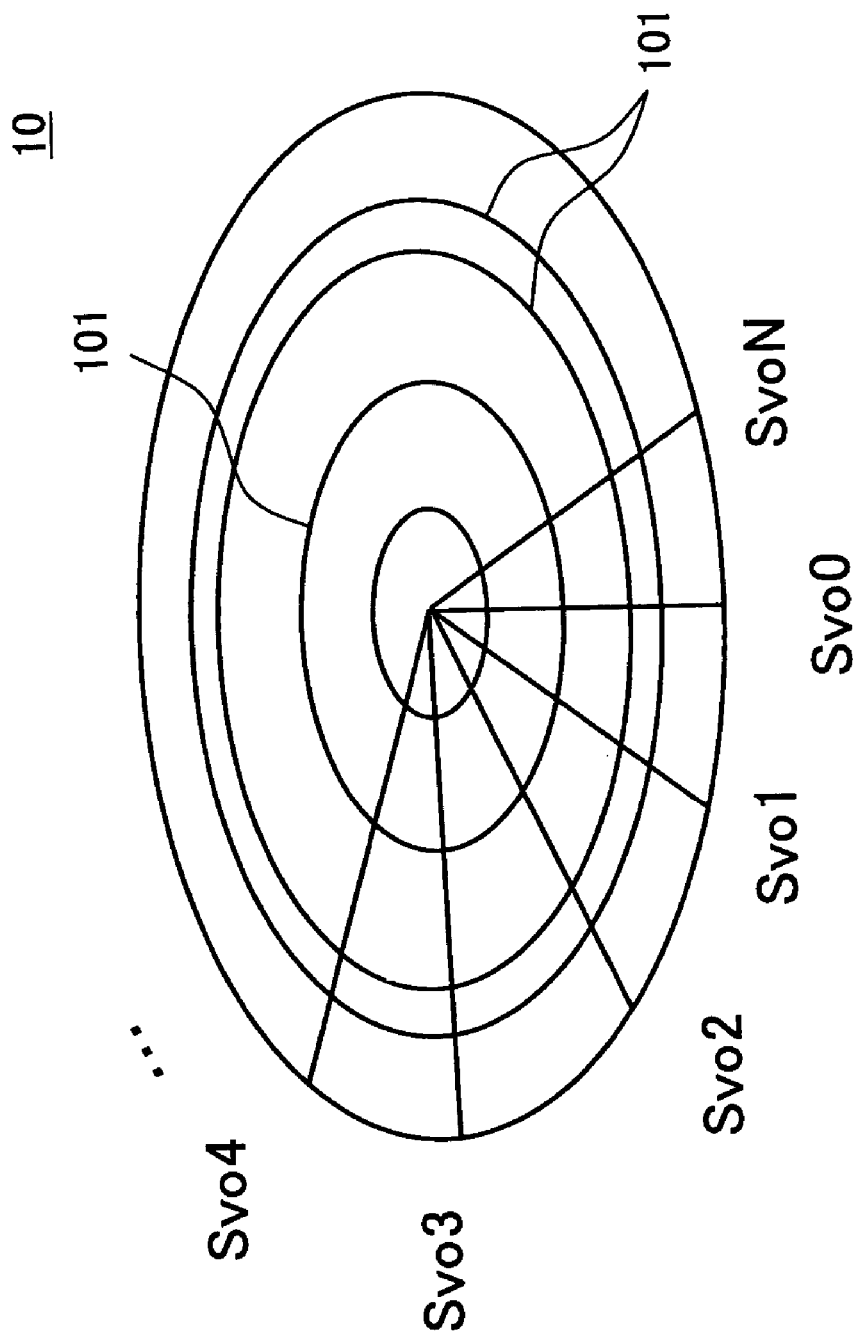
FIG. 3 is a diagram for explaining a servo frame on a magnetic disk.

It is assumed that STW tracks (or cylinders) have been formed in advance on the magnetic disk 10 by a stack STW (not shown) and servo information is recorded in advance on the STW tracks (or cylinders). FIG. 3 is a diagram for explaining a servo frame on the magnetic disk 10. The servo information, including the information (track number) for identifying the track and the information (sector number) for identifying the sector, is recorded in a first portion of each sector, that is, in each of servo frames Svo0, Svo1, . . . , SvoN as shown in FIG. 3 in the case of the magnetic disk 10 employing the data surface servo system, where N is an arbitrary integer. In FIG. 3, a reference numeral 101 denotes an STW track (or cylinder) that has been formed by the stack STW. In a case where the magnetic disk apparatus is provided with a plurality of magnetic disks 10, the cylinder is formed by corresponding tracks of the plurality of magnetic disks 10.

The servo information write part 1 supplies to the magnetic head 4 the servo information that is to be written on the magnetic disk 10. The actuator 2 drives the arm 3 under control of the head driving control part 8, so as to control the position of the magnetic head 4 provided on the tip end of the arm 3. In the case where a plurality of magnetic disks 10 are provided, the magnetic disk apparatus is of course provided with a plurality of magnetic heads 4. Further, in a case where the information is to be recorded and reproduced with respect to both surfaces of the magnetic disks 10, a pair of magnetic heads 4 is of course provided with respect to each magnetic disk 10.

The servo information detecting part 5 detects the servo information from the information that is read from the magnetic disk 10 by the magnetic head 4, and supplies the detected servo information to the correction value measuring part 6 and the servo information correcting part 7. In the predetermined operation mode in which the correction value measuring part 6 is active, the correction value measuring part 6 measures the eccentricity based on the servo information and calculates a correction value for controlling the position of the magnetic head 4 so that the magnetic head 4 scans a virtual circular locus approximately matching the STW track that has been formed by the stacked STW. The calculated correction value is supplied to the servo information write part 1. Hence, the magnetic head 4 writes the correction value from the servo information write part 1 within the specific servo frame of the STW track. The correction value for correcting the eccentricity desirably indicates the correction value that is calculated from the amount of the eccentricity and the phase of the eccentricity (angular direction of the eccentricity) of the magnetic disk 10 loaded within the magnetic disk apparatus, which are measured by the correction value measuring part 6. However, the correction value for correcting the eccentricity may be information that indicates the eccentricity, such as the amount and the phase of the eccentricity. In this latter case, it is necessary to calculate the correction value from the information indicating the eccentricity (such as the amount and the phase of the eccentricity) at the time of correcting the eccentricity.

In the predetermined operation mode, the servo information correcting part 7 controls the head driving control part 8 based on the servo information detected by the servo information detecting part 5, so as to control the position of the magnetic head 4 to follow and scan the STW track.

The eccentricity is mainly generated due to a deviation of the center of the magnetic disk 10. Normally, the first order component of the eccentricity is dominant, but the eccentricity also includes high order components. In this embodiment, the correction value corrects only the first order component of the eccentricity.

Figures 4, 5:
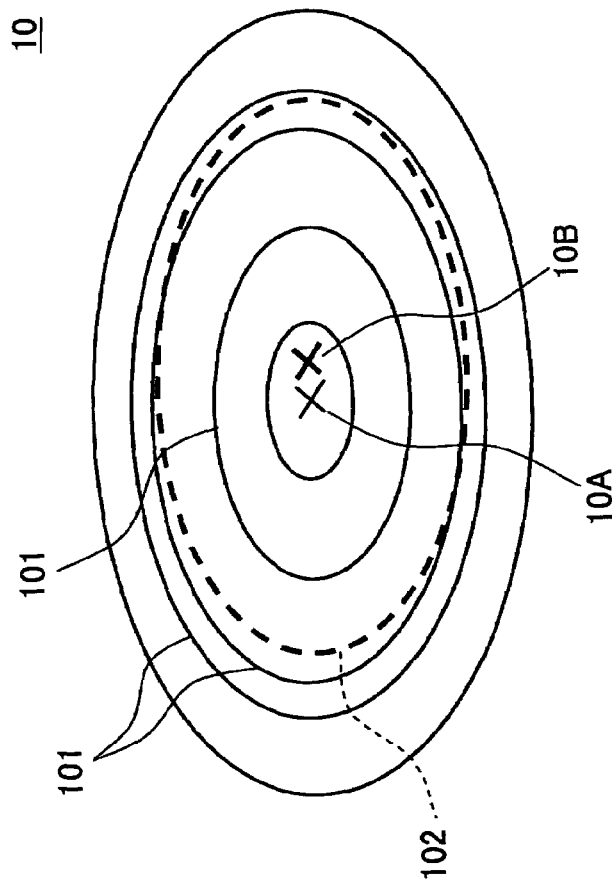
FIG. 4 is a diagram for explaining a structure of the servo frame.
FIG. 5 is a diagram for explaining a scanning locus of a magnetic head on the magnetic disk.

FIG. 4 is a diagram for explaining a structure of the servo frame. As shown in FIG. 4, the servo frame includes a servo preamble part for indicating the servo information, a servo mark part SM for indicating a start of the contents of the servo information, a Gray code part GrayCode for indicating the track number, burst (or position) parts PosA, PosB, PosC and PosD for indicating information below the decimal point of the track number, and servo post data parts SPD1 and SPD2. The variations caused by the eccentricity and the like of the disk similarly repeat with a period amounting to one revolution of the disk, and is called a Repeatable Run Out (RRO). The servo post data parts SPD1 and SPD2 record suppressing information for suppressing the RRO. In this embodiment, the correction value is recorded in place of the suppressing information for suppressing the RRO in the servo post data parts SPD1 and SPD2 within the servo frame of a specific track (or cylinder). However, it is of course possible to record the correction value in place of the suppressing information for suppressing the RRO in only one of the servo post data parts SPD1 and SPD2.

FIG. 5 is a diagram for explaining the scanning locus of the magnetic head 4 on the magnetic disk 10. In FIG. 5, a reference numeral 10A indicates the center of the STW track 101 that has been formed by the stack STW, that is, the rotary axis of the magnetic disk 10 within the stack STW. In addition, a reference numeral 102 indicates a scanning locus of the magnetic head 4 with respect to the magnetic disk 10 within the magnetic disk apparatus shown in FIG. 2. A reference numeral 10B indicates a center of the scanning locus 102, that is, a rotary axis of the magnetic disk 10 within the magnetic disk apparatus.

On the other hand, in the normal operation mode in which the correction value measuring part 6 is inactive, the servo information correcting part 7 reproduces the correction value from the servo post data parts SPD1 and SPD2 within the servo frame of the specific track (or cylinder), of the servo information supplied from the servo information detecting part 5, and supplies to the head driving control part 8 a control signal for correcting the eccentricity by controlling the position of the magnetic head 4 depending on the correction value. Accordingly, the head driving control part 8 controls the position of the magnetic head 4, based on the control signal which takes into consideration the correction value, so that the magnetic head 4 scans a virtual circular locus approximately matching the STW track 101 that has been formed by the stack STW. In the case where the correction value indicates the amount and the phase of the eccentricity and not the actual correction value for correcting the eccentricity, the actual correction value may be calculated within the servo information correcting part 7 based on the amount and the phase of the eccentricity.

Figure 6:
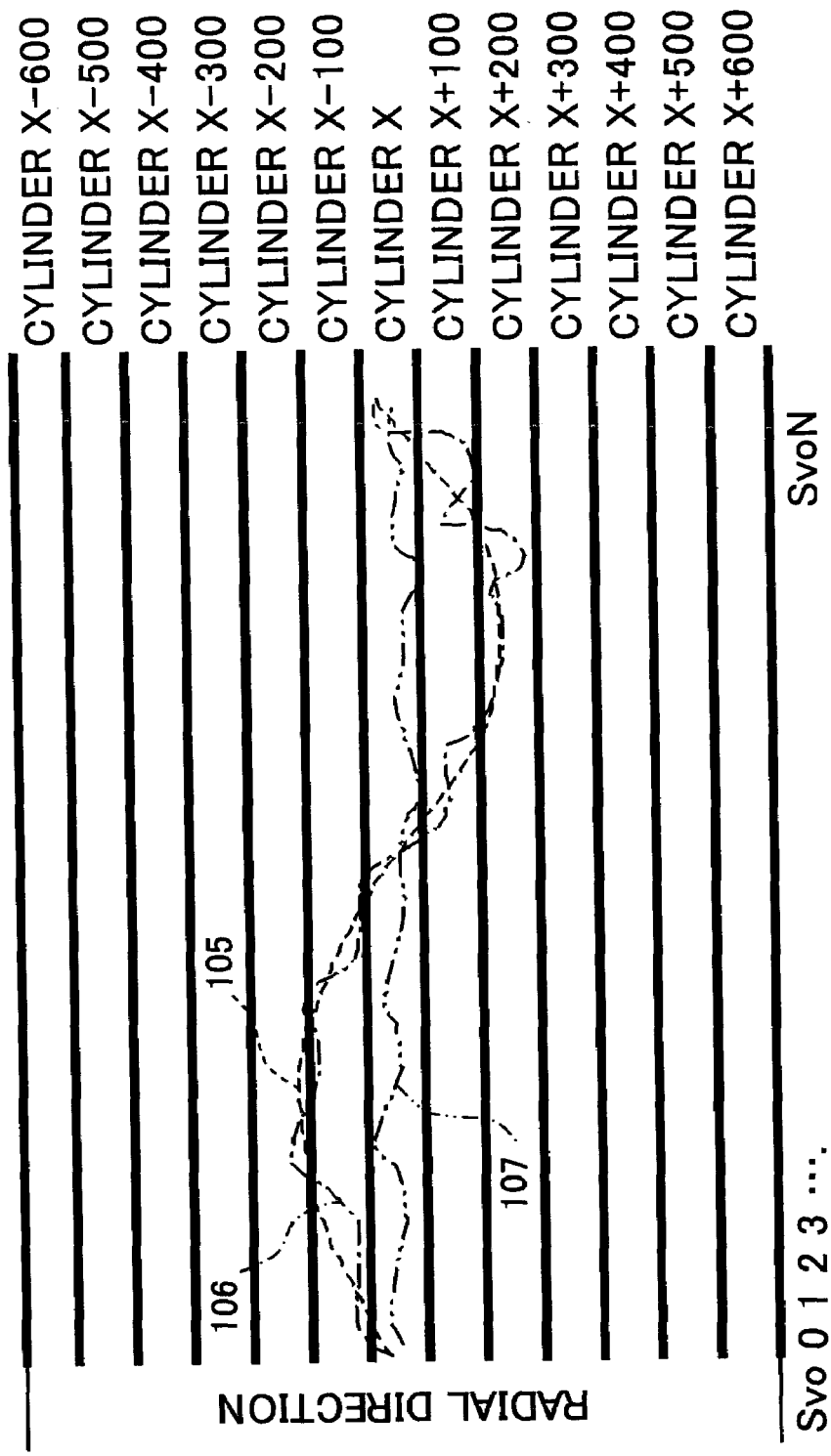
FIG. 6 is a diagram for explaining a relationship of the STW track and a virtual circular locus.

FIG. 6 is a diagram for explaining a relationship of the STW track 101 and the virtual circular locus. In FIG. 6, the ordinate indicates the cylinder numbers (or track numbers) and correspond to the radial direction of the magnetic disk 10, and the abscissa indicates the servo frame numbers Svo0, Svo1, . . . , SvoN. In addition, a dotted line 105 indicates a cylinder (or track) formed on the magnetic disk 10 by the magnetic head 4 of the magnetic disk apparatus when taking into consideration only the first order component of the eccentricity, and bold solid lines indicate the STW cylinders (or tracks) 101 by horizontal straight lines for the sake of convenience. Furthermore, a one-dot chain line 106 indicates a cylinder (or track) formed on the magnetic disk 10 by the magnetic head 4 of the magnetic disk apparatus when taking into consideration the high order components other than the first order component of the eccentricity, and a two-dot chain line 107 indicates a virtual circular locus of the magnetic head 4, that has been corrected based on the correction value for correcting only the first order component of the eccentricity, and approximately matches the STW cylinder (or track) 101. The virtual circular locus 107 includes the high order components of the eccentricity other than the first order component of the eccentricity. Although shown in an exaggerated manner in FIG. 6, the remaining high order components of the eccentricity actually only correspond to approximately 1 cylinder (or track), and thus, it may be seen that only ±1 cylinder (or track) needs to be skipped and defined as the SA cylinder (or track) so as not to be used as the user cylinder (or track). Therefore, compared to the case shown in FIG. 1 where approximately ±100 cylinders (or tracks) need to be skipped, the number of cylinders (or tracks) to be skipped is greatly reduced and the user area is accordingly increased.

The correction value that is stored in the servo post data parts SPD1 and SPD2 is approximately 32 bits, for example. For this reason, the virtual circular locus 107 will not perfectly match the STW track 101 on the magnetic disk 10, but will approximately match the STW track 101 to such an extent that no problems are encountered from the practical point of view. In addition, since the data length of the servo post data parts SPD1 and SPD2 that record the correction value is short, it is sufficient to provide 2 cylinders (or tracks) at the most.

The servo information detecting part 5 and the correction value measuring part 6 form a correction value acquiring unit or means for measuring the eccentricity of the magnetic disk 10 and for controlling the magnetic head 4 so as to scan the virtual circular locus 107 approximately matching the STW track 101. The servo information write part 1 forms a write unit or means for supplying the correction value to the magnetic head 4 and for writing the correction value in the specific servo frame. The servo information detecting part 5, the servo information correcting part 7 and the head driving control part 8 form a control unit or means for controlling the magnetic head 4 during a seek, based on the correction value read from the specific servo frame, so that the magnetic head 4 scans the virtual circular locus 107 approximately matching the STW track 101.

Figure 7:
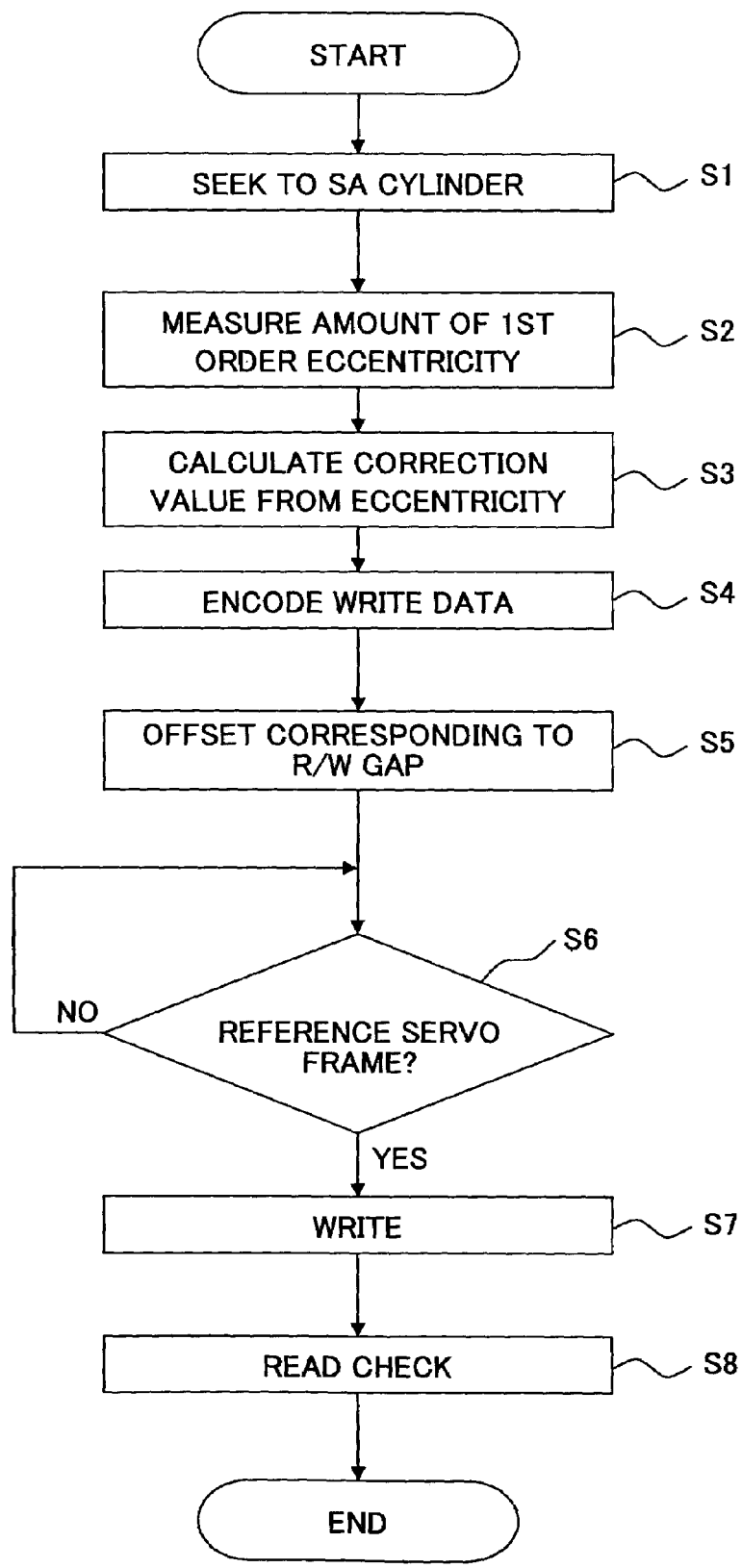
FIG. 7 is a flow chart for explaining an operation of the first embodiment when writing a correction value.
Figure 8:
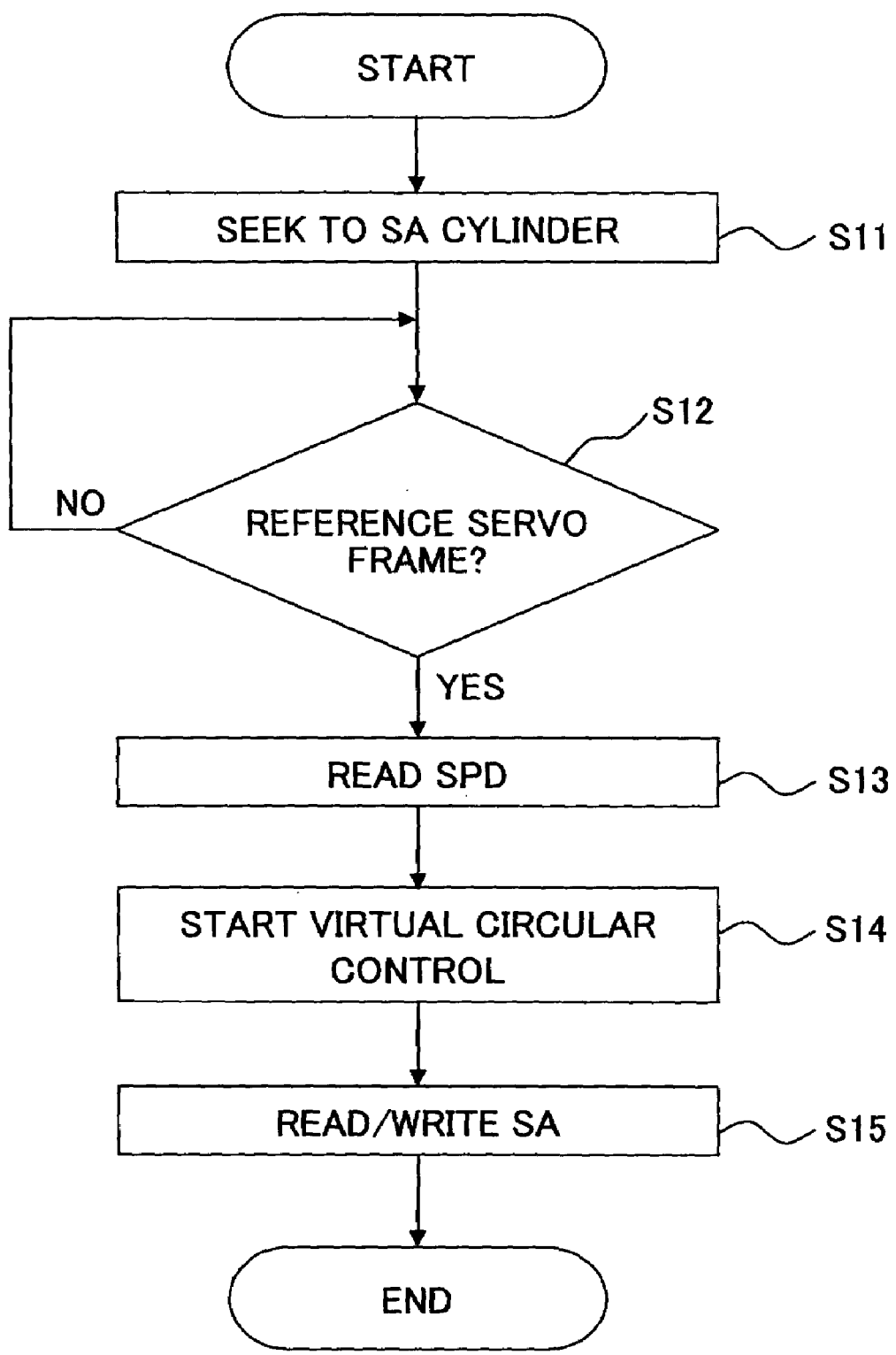
FIG. 8 is a flow chart for explaining an operation of the first embodiment when reading the correction value.

In the magnetic disk apparatus shown in FIG. 2, the functions of all or a part of the servo information write part 1, the servo information detecting part 5, the correction value measuring part 6, the servo information correcting part 7 and the head driving control part 8 may be realized by one or a plurality of processors, such as one or more CPUs. FIGS. 7 and 8 are flow charts showing an operation of such a processor.

FIG. 7 is a flow chart for explaining an operation of the first embodiment when writing the correction value, and this operation is started when an instruction instructing the predetermined operation mode is received from a host unit (not shown), for example. In a step S1 shown in FIG. 7, the head driving control part 8 controls the actuator 2 so that the magnetic head 4 seeks a track (or cylinder) of a preset SA on the magnetic disk 10. In a step S2, the correction value measuring part 6 measures the first order component of the eccentricity (hereinafter referred to as an amount of first order eccentricity) based on the servo information that is read by the magnetic head 4 from the SA track (or cylinder) on the magnetic disk 10. The amount of first order eccentricity includes the amount of eccentricity, the phase of the eccentricity (angular direction of the eccentricity) and the like. In a step S3, the correction value measuring part 6 calculates the correction value for controlling the position of the magnetic head 4 so that the magnetic head 4 scans the virtual circular locus 107 approximately matching the STW track 101 that has been formed by the stack STW. In this case, the correction value is with respect to the amount of first order eccentricity, and is a coefficient of the Discrete Fourier Transform (DFT), such as sine and cosine. Hence, it is sufficient for the correction value to be represented by a data of approximately 32 bits, for example.

In a step S4, the correction value measuring part 6 adds a parity or an Error Correction Code (ECC) to the calculated correction value (data), and encodes the correction value that is added with the parity or ECC, so as to create write data. Since a read gap and a write gap of the magnetic head 4 are formed at positions deviated along a track direction (a direction in which the track extends) of the magnetic disk 10, a read position and a write position are deviated along the radial direction of the magnetic disk 10 even when the magnetic head 4 is located at the same position, due to reasons such as the magnetic head 4 being mounted on the arm 3 that pivots about an axis. Hence, in a step S5, the servo information correcting part 7 obtains an offset by taking into consideration amounts corresponding to the read/write (R/W) gaps, so that the magnetic head 4 can read the write data (correction value) at the position where the measurement described above was made. In a step S6, the servo information correcting part 7 controls the head driving control part 8 so as to seek the SA track (or cylinder) by taking into account this offset, and the servo information detecting part 5 decides whether or not the magnetic head 4 has reached a preset reference servo frame within the SA track (or cylinder). If the decision result in the step S6 becomes YES, the process advances to a step S7. In the step S7, the servo information write part 1 carries out a write, to write the write data from the correction value measuring part 6 in the servo post data parts SPD1 and SPD2 within the reference servo frame, while carrying out a known tracking with respect to the STW track 101. In a step S8, the servo information correcting part 7 carries out a read check, to decide whether or not the written write data can be read correctly from the reference servo frame, and the process ends. If the written write data cannot be read correctly from the reference servo frame as a result of the read check, an alarm is generated, for example.

FIG. 8 is a flow chart for explaining an operation of the first embodiment when reading the correction value, and this operation is started when an instruction instructing a normal operation mode is received from the host unit (not shown), for example. The read or write access (read/write access) during the seek or the like is carried out during the normal operation mode. In a step S11 shown in FIG. 8, the servo information correcting part 7 controls the head driving control part 8 so as to seek the preset SA track (or cylinder) on the magnetic disk 10. In a step S12, the servo information detecting part 5 decides whether or not the magnetic head 4 has reached the reference servo frame within the SA track (or cylinder). If the decision result in the step S12 becomes YES, the process advances to a step S13. In the step S13, the servo information detecting part 5 reads the write data, that is, the correction value, recorded in the servo post data parts SPD1 and SPD2 within the reference servo frame. In a step S14, the servo information correcting part 7 supplies to the head driving control part 8 a control signal for controlling the position of the magnetic head 4 depending on the correction value and for correcting the eccentricity, so as to start a first order virtual circular control. The first order virtual circular control controls the position of the magnetic head 4 so that the magnetic head 4 scans the virtual circular locus 107 approximately matching the STW track 101 that has been formed by the stack STW. In a step S15, a known read and/or write (read/write) is carried out with respect to the SA of the magnetic disk 10 in a state where the magnetic head 4 is controlled to scan the virtual circular locus 107, and the process ends. Since the virtual circular control is carried out from the point in time when the correction value can be read, the access can be made by the virtual circular locus 107 of the virtual circular control starting from the first SA, to thereby suppress the number of tracks (or cylinders) that cannot be used as the user track (or cylinder) to a minimum.

In FIG. 7, the reference servo frame may be set within one SA track (or cylinder) or, one or a plurality of reference servo frames may be set within a plurality of SA tracks (or cylinders). In other words, the write data (correction vale) may be written on the magnetic disk 10 a plurality of times. In this case, the seek in FIG. 8 may be carried out until the magnetic head 4 reaches one reference servo frame from which the write data (correction value) can be read, of the plurality of reference servo frames written with the write data (correction value).

Figure 9:
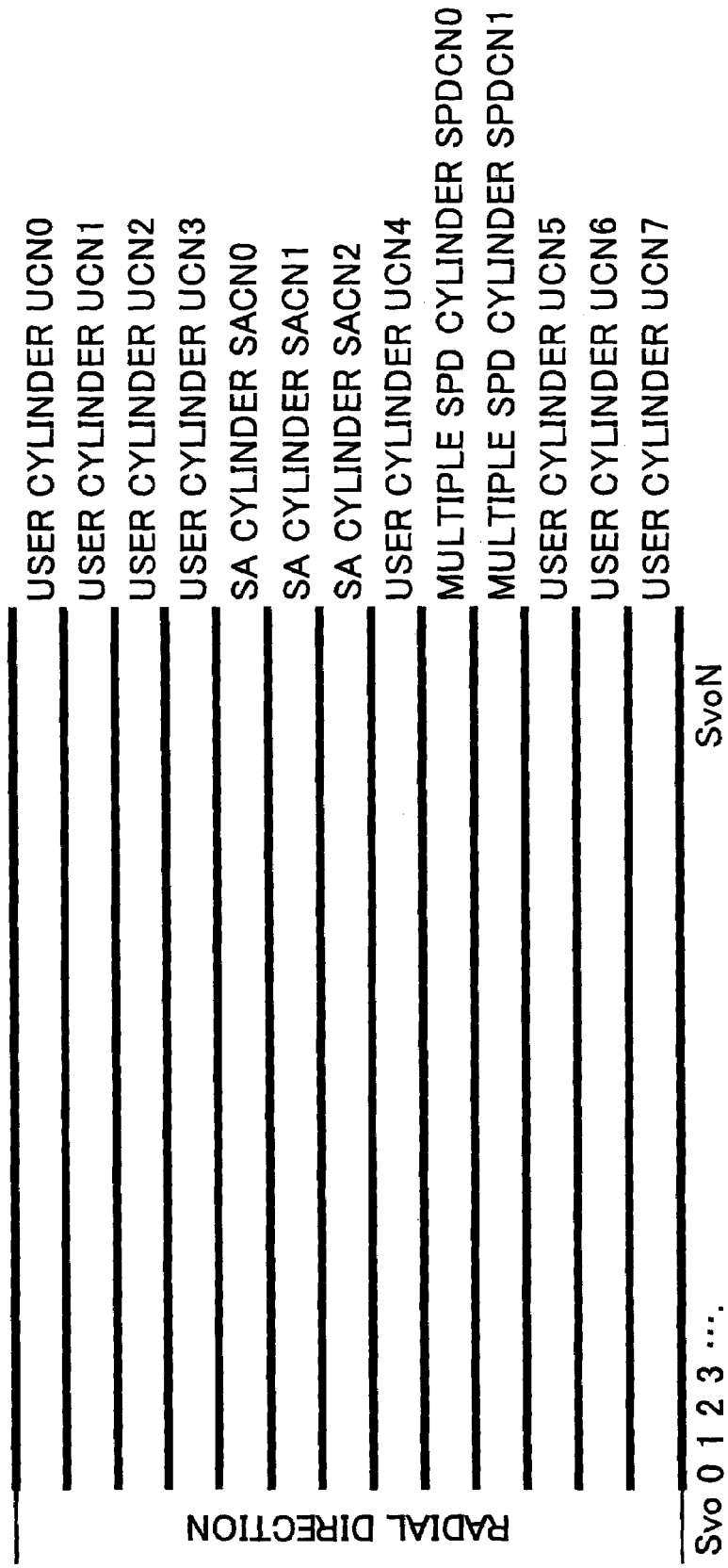
FIG. 9 is a diagram for explaining skipping of an SA track.

FIG. 9 is a diagram for explaining skipping of the SA track. In FIG. 9, the ordinate indicates the cylinder numbers (or track numbers) and correspond to the radial direction of the magnetic disk 10, and the abscissa indicates the servo frame numbers Svo0, Svo1, . . . , SvoN. In addition, bold solid lines indicate the scanning loci 102, that is, the cylinders (or tracks) that are formed by magnetic head 4 by horizontal straight lines for the sake of convenience. In FIG. 9, the user cylinders (or tracks) have track numbers UCN0 through UCN7, and the SA cylinders (or tracks) have track numbers SACN0 through SACN2 which are different from the track numbers of the user cylinders (or tracks). Cylinders (or tracks) having multiple SPDs written with the write data (correction value) have track numbers SPDCN0 and SPDCN1 which are different from the track numbers of the user cylinders (or tracks). In other words, the SA cylinders (or tracks) having the track numbers SACN0 through SACN2 are provided next to the user cylinders (or tracks) having the track numbers UCN0 through UCN3, and the user cylinder (or track) having the track number UCN4 is provided next to these SA cylinders (or tracks), so that the track numbers of the user cylinders (or tracks) are consecutive. As a result, the user of the host unit or the like can use the user cylinders (or tracks) having the track numbers UCN0 through UCN4 as consecutive user cylinders (or tracks) without having to be aware of the actual locations of the user cylinders (or tracks) having the track numbers UCN0 through UCN4. Similarly, the cylinders (or tracks) having multiple SPDs recorded with the write data (correction value) and having the track numbers SPDCN0 and SPDCN1 are provided next to the user cylinder (or track) having the track number UCN4, and the user cylinders (or tracks) having the track numbers UCN5 through UCN7 are provided next to these cylinders (or tracks) having the track numbers SPDCN0 and SPDCN1. Hence, the user of the host unit or the like can use the user cylinders (or tracks) having the track numbers UCN4 through UCN7 as consecutive user cylinders (or tracks) without having to be aware of the actual locations of the user cylinders (or tracks) having the track numbers UCN4 through UCN7. Therefore, the user of the host unit or the like can use the user cylinders (or tracks) as consecutive user cylinders (or tracks) without having to be aware of the actual locations of the user cylinders (or tracks), by skipping the SA that is made up of the SA cylinders (or tracks) and the cylinders (or tracks) having multiple SPDs recorded with the write data (correction value).

Next, a description will be given of a second embodiment of the disk apparatus according to the present invention. The basic structure of this second embodiment of the disk apparatus may be the same as the basic structure of the first embodiment of the disk apparatus shown in FIG. 2, and thus, illustration and description thereof will be omitted. This second embodiment of the disk apparatus employs a second embodiment of the head position control method according to the present invention. In this embodiment, the present invention is applied to a magnetic disk apparatus. In addition, this embodiment for the sake of convenience employs the data surface servo system that records both the data and the servo information on the same surface of the magnetic disk.

There is a conventional technique called defect registration that registers defects, such as damaged portions on the disk, in units of sectors. A defective sector that is registered in the SA by the defect registration is not treated as a user sector. Accordingly, of the tracks (or cylinders) that have been formed by the stack STW, this embodiment registers the user sector which has a possibility of overlapping with the sector that is written with the information for correcting the eccentricity of the disk as a defective sector by the defect registration, so that it is possible to positively protect the region that is non-usable by the user and minimize such a non-usable region.

The servo information detecting part 5 and the correction value measuring part 6 form a correction value acquiring unit or means for measuring the eccentricity of the magnetic disk 10 and for calculating a correction value for controlling the magnetic head 4 so as to scan the virtual circular locus 107 that approximately matches the STW track 101. The servo information write part 1 forms a write unit or means for supplying the correction value to the magnetic head 4 and for writing the correction value in a specific SA track within the SA that is non-accessible by the user. The servo information detecting part 5, the servo information correcting part 7 and the head driving control part 8 form a unit or means for controlling the magnetic head 4 during a seek, based on the correction value read from the specific SA track, so that the magnetic head 4 scans the virtual circular locus 107 approximately matching the STW track 101.

Figure 10:
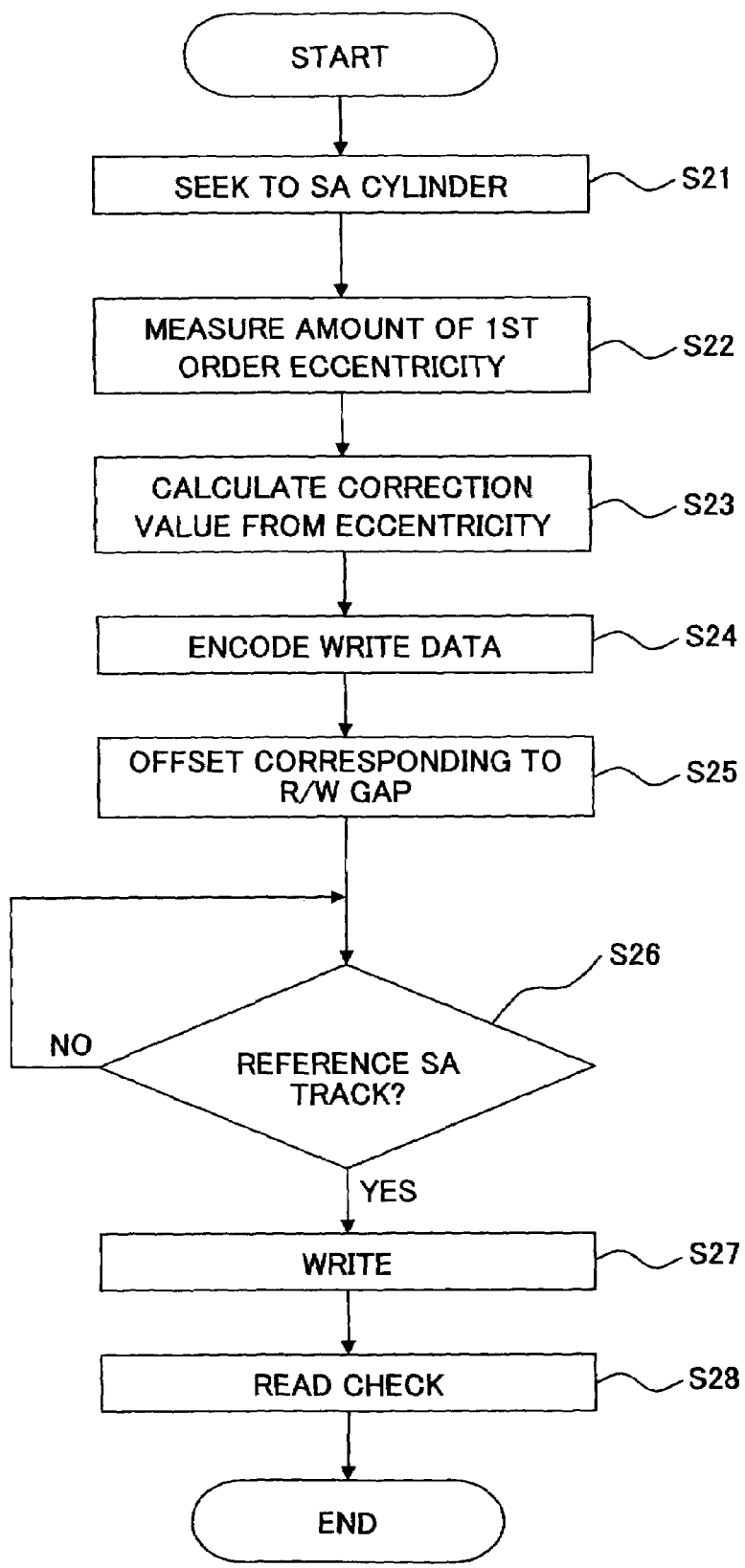
FIG. 10 is a flow chart for explaining an operation of a second embodiment of the disk apparatus according to the present invention when writing a correction value.
Figure 11:
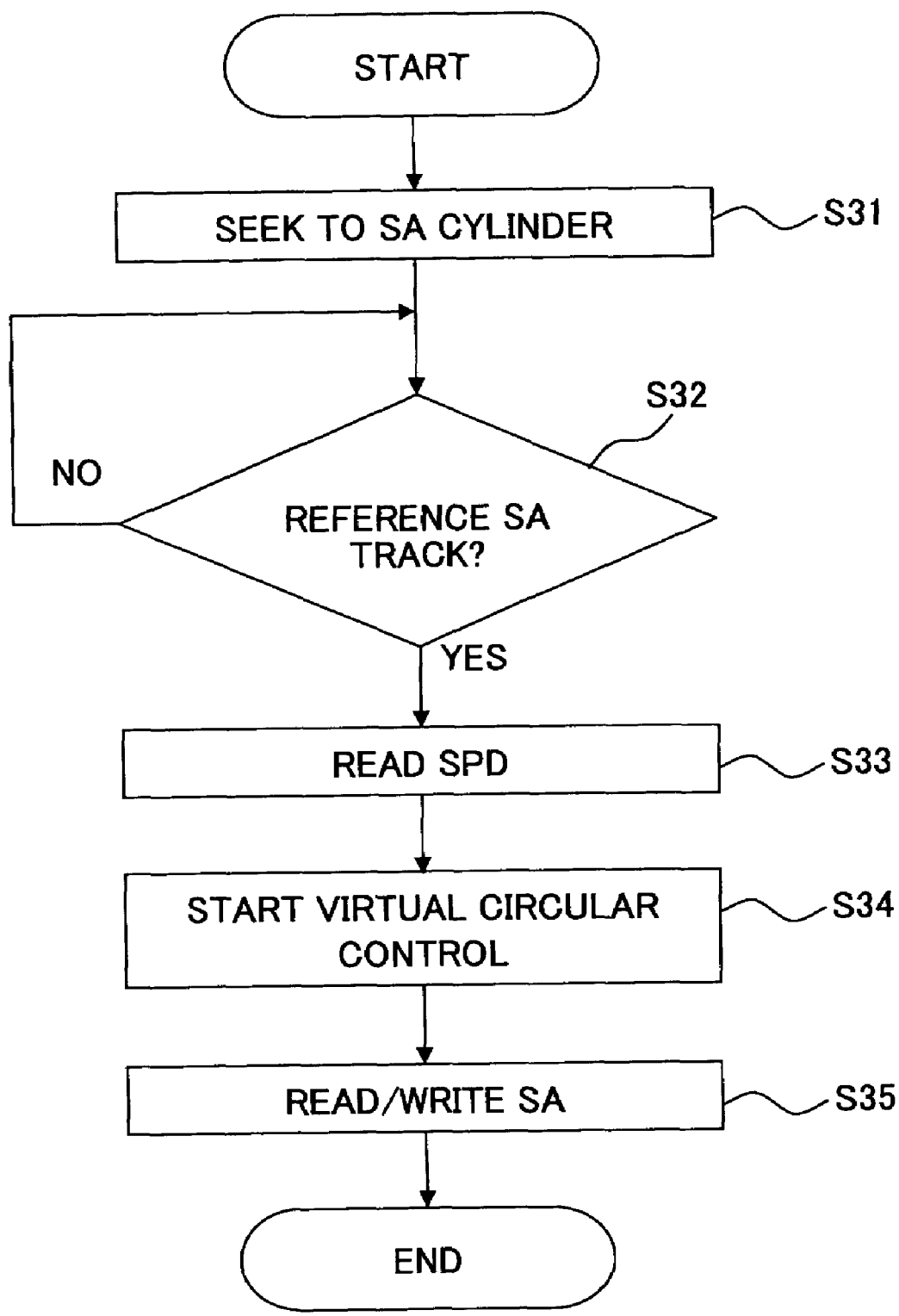
FIG. 11 is a flow chart for explaining an operation of the second embodiment when reading the correction value.

In the magnetic disk apparatus shown in FIG. 2, the functions of all or a part of the servo information write part 1, the servo information detecting part 5, the correction value measuring part 6, the servo information correcting part 7 and the head driving control part 8 may be realized by one or a plurality of processors, such as one or more CPUs. FIGS. 10 and 11 are flow charts showing an operation of such a processor.

FIG. 10 is a flow chart for explaining an operation of the second embodiment of the disk apparatus when writing the correction value, and this operation is started when an instruction instructing the predetermined operation mode is received from a host unit (not shown), for example. In a step S21 shown in FIG. 10, the head driving control part 8 controls the actuator 2 so that the magnetic head 4 seeks a preset SA track (or cylinder) on the magnetic disk 10. In a step S22, the correction value measuring part 6 measures the first order component of the eccentricity (hereinafter referred to as an amount of first order eccentricity) based on the servo information that is read by the magnetic head 4 from the SA track (or cylinder) on the magnetic disk 10. The amount of first order eccentricity includes the amount of eccentricity, the phase of the eccentricity (angular direction of the eccentricity) and the like. In a step S23, the correction value measuring part 6 calculates the correction value for controlling the position of the magnetic head 4 so that the magnetic head 4 scans the virtual circular locus 107 approximately matching the STW track 101 that has been formed by the stack STW. In this case, the correction value is with respect to the amount of first order eccentricity, and is a coefficient of the Discrete Fourier Transform (DFT), such as sine and cosine. Hence, it is sufficient for the correction value to be represented by a data of approximately 32 bits, for example.

In a step S24, the correction value measuring part 6 adds a parity or an Error Correction Code (ECC) to the calculated correction value (data), and encodes the correction value that is added with the parity or ECC, so as to create write data. Since the read gap and the write gap of the magnetic head 4 are formed at positions deviated along the track direction (the direction in which the track extends) of the magnetic disk 10, the read position and the write position are deviated along the radial direction of the magnetic disk 10 even when the magnetic head 4 is located at the same position. Hence, in a step S25, the servo information correcting part 7 obtains an offset by taking into consideration amounts corresponding to the read/write (R/W) gaps, so that the magnetic head 4 can read the write data (correction value) at the position where the measurement described above was made. In a step S26, the servo information correcting part 7 controls the head driving control part 8 so as to seek the SA track (or cylinder) by taking into account this offset, and the servo information detecting part 5 decides whether or not the magnetic head 4 has reached a preset reference SA track (or cylinder) within the SA. If the decision result in the step S26 becomes YES, the process advances to a step S27. In the step S27, the servo information write part 1 carries out a write, to write the write data from the correction value measuring part 6 in the reference SA track (or cylinder) in place of the defect registration information, while carrying out a known tracking with respect to the STW track 101. In a step S18, the servo information correcting part 7 carries out a read check, to decide whether or not the written write data can be read correctly from the reference SA track (or cylinder), and the process ends. If the written write data cannot be read correctly from the reference SA track (or cylinder) as a result of the read check, an alarm is generated, for example.

FIG. 11 is a flow chart for explaining an operation of the second embodiment when reading the correction value, and this operation is started when an instruction instructing a normal operation mode is received from the host unit (not shown), for example. The read or write access (read/write access) during the seek or the like is carried out during the normal operation mode. In a step S31 shown in FIG. 11, the servo information correcting part 7 controls the head driving control part 8 so as to seek the preset SA on the magnetic disk 10. In a step S32, the servo information detecting part 5 decides whether or not the magnetic head 4 has reached the reference SA track (or cylinder) within the SA. If the decision result in the step S32 becomes YES, the process advances to a step S33. In the step S33, the servo information detecting part 5 reads the write data, that is, the correction value, recorded in the reference SA track (or cylinder). In a step S34, the servo information correcting part 7 supplies to the head driving control part 8 a control signal for controlling the position of the magnetic head 4 depending on the correction value and for correcting the eccentricity, so as to start a first order virtual circular control. The first order virtual circular control controls the position of the magnetic head 4 so that the magnetic head 4 scans the virtual circular locus 107 approximately matching the STW track 101 that has been formed by the stack STW. In a step S35, a known read and/or write (read/write) is carried out with respect to the SA of the magnetic disk 10 in a state where the magnetic head 4 is controlled to scan the virtual circular locus 107, and the process ends. Since the virtual circular control is carried out from the point in time when the correction value can be read, the access can be made by the virtual circular locus 107 of the virtual circular control starting from the first SA, to thereby suppress the number of tracks (or cylinders) that cannot be used as the user track (or cylinder) to a minimum.

In FIG. 10, the reference SA track (or cylinder) may be set within one SA or, one or a plurality of reference SA tracks (or cylinders) may be set within a plurality of SAs. In other words, the write data (correction value) may be written on the magnetic disk 10 a plurality of times. In this case, the seek in FIG. 11 may be carried out until the magnetic head 4 reaches one reference SA track (or cylinder) from which the write data (correction value) can be read, of the plurality of reference SA tracks (or cylinders) written with the write data (correction value).

According to each of the embodiments described above, the magnetic disk apparatus may employ existing hardware, and only the process carried out by the processor (that is, the firmware) needs to be modified. For this reason, it is possible to control the position of the magnetic head so as to scan the virtual circular locus approximately matching the STW track with a high precision and at a low cost. In other words, in the case of the first embodiment, the firmware simply needs to be modified to write the correction value in the servo post data parts SPD1 and SPD2 within the specific (or reference) servo frame in place of the SPD, and to read the correction value for use in controlling the position of the magnetic head. In the case of the second embodiment, the firmware simply needs to be modified to write the correction value in the specific (or reference) SA track in place of the defect registration information, and to read the correction value for use in controlling the position of the magnetic head.

Although the present invention is applied to the magnetic disk and the magnetic disk apparatus in the embodiments described above, the present invention is of course not limited to such. The present invention is similarly applicable to other disks and disk apparatuses, such as optical disks and optical disk apparatuses, and magneto-optic disks and magneto-optic disk apparatuses. In addition, the present invention is not limited to the disk employing the data surface servo system, and is similarly applicable to a disk employing a servo surface servo system which records the servo information on an exclusive surface of the disk provided exclusively for recording the servo information.

Further, the present invention is not limited to these embodiments, but various variations and modifications may be made without departing from the scope of the present invention.

What is claimed is:

1. A head position control method for controlling a position of a head of a first apparatus with respect to a disk which has been formed with a plurality of tracks and has been recorded with servo information including position information in servo frames by a second apparatus that is different from the first apparatus, comprising the steps of:
   (a) measuring an eccentricity of the disk in the first apparatus and calculating a correction value for controlling the head to scan a virtual circular locus approximately matching the plurality of tracks;
   (b) writing the correction value in a specific servo frame of only a specific track in the first apparatus, wherein at least one of the plurality of tracks does not include the correction value written thereon; and
   (c) controlling the head during a seek in the first apparatus for any of the plurality of tracks, based on the correction value read from the specific servo frame, so that the head scans the virtual circular locus approximately matching the plurality of tracks which have been formed by the second apparatus.

2. The head position control method as claimed in claim 1, wherein the correction value corrects a first order component of the eccentricity other than high order components of the eccentricity.

3. head position control method as claimed in claim 1, further comprising the steps of:
   (d) defining the specific track including the specific servo frame that is written with the correction value as a track of a System Area (SA) which is non-accessible by a user.

4. The head position control method as claimed in claim 3, wherein said step (d) sets consecutive track numbers to user tracks that are accessible by the user, regardless of whether or not the track of the System Area (SA) exists among the user tracks, so as to enable skipping of the track of the System Area (SA).

5. The head position control method as claimed in claim 1, wherein said step (b) writes the correction value in a Servo Post Data (SPD) part that is recorded with suppressing information for suppressing Repeatable Run Out (RRO), in place of said suppressing information.

6. The head position control method as claimed in claim 1, wherein a plurality of disks are provided within the first apparatus, and said steps (a), (b) and (c) are carried out with respect to a cylinder that is formed by corresponding tracks of each of the plurality of disks.

7. The head position control method as claimed in claim 1, further comprising the steps of:
   (e) carrying out a read and/or a write to read and/or write information with respect to a track of a System Area (SA) which is non-accessible by a user, on the virtual circular locus.

8. A head position control method for controlling a position of a head of a first apparatus with respect to a disk which has been formed with a plurality of tracks and has been recorded with servo information including position information in servo frames by a second apparatus that is different from the first apparatus, comprising the steps of:
   (a) measuring an eccentricity of the disk in the first apparatus and calculating a correction value for controlling the head to scan a virtual circular locus approximately matching the plurality of tracks;
   (b) writing the correction value oniy in a specific System Area (SA) track within a System Area (SA) that is non-accessible by a user in the first apparatus, wherein at least one of the plurality of tracks does not include the correction value written thereon; and
   (c) controlling the head during a seek in the first apparatus for any of the plurality of tracks, based on the correction value read from the specific System Area (SA) track, so that the head scans the virtual circular locus approximately matching the plurality of tracks which have been formed by the second apparatus.

9. The head position control method as claimed in claim 8, wherein the correction value corrects a first order component of the eccentricity other than high order components of the eccentricity.

10. The head position control method as claimed in claim 8, wherein a plurality of disks are provided within the first apparatus, and said steps (a), (b) and (c) are carried out with respect to a cylinder that is formed by corresponding tracks of each of the plurality of disks.

11. The head position control method as claimed in claim 8, further comprising the steps of:
   (d) carrying out a read and/or a write to read and/or write information with respect to a track of the System, Area (SA), on the virtual circular locus.

12. a disk apparatus operable with a disk which is formed with a plurality of tracks and is recorded with servo information including position information in servo frames by another disk apparatus, comprising:
   a head configured to read and write information with respect to the disk;
   a correction value acquiring unit configured to measure an eccentricity of the disk and to calculate a correction value for controlling the head to scan a virtual circular locus approximately matching the plurality of tracks;

a write unit configured to write the correction value in a specific servo frame of only a specific track by supplying the correction value to the head, wherein at least one of the plurality of tracks does not include the correction value written thereon; and a control unit configured to control the head during a seek of any of the plurality of tracks, based on the correction value read from the specific servo frame, so that the head scans the virtual circular locus approximately matching the plurality of tracks.

13. The disk apparatus as claimed in claim 12, wherein the correction value corrects a first order component of the eccentricity other than high order components of the eccentricity.

14. The disk apparatus as claimed in claim 12, wherein the specific track including the specific servo frame that is written with the correction value is defined as a track of a System Area (SA) which is non-accessible by a user.

15. The disk apparatus as claimed in claim 14, wherein consecutive track numbers are set to user tracks that are accessible by the user, regardless of whether or not the track of the System Area (SA) exists among the user tracks, so as to enable skipping of the track of the System Area (SA).

16. The disk apparatus as claimed in claim 12, wherein said write unit writes the correction value in a Servo Post Data (SPD) part that is recorded with suppressing information for suppressing Repeatable Run Out (RRO), in place of said suppressing information.

17. The disk apparatus as claimed in claim 12 that is operable with a plurality of disks, wherein said write unit writes the correction value with respect to a cylinder that is formed by corresponding tracks of each of the plurality of disks.

18. The disk apparatus as claimed in claim 12, further comprising:

a unit configured to carry out a read and/or a write to read and/or write information with respect to a track of a System Area (SA) which is non-accessible by a user, on the virtual circular locus.

19. A disk apparatus operable with a disk which is formed with a plurality of tracks and is recorded with servo information including position information in servo frames by another disk apparatus, comprising:

a head configured to read and write information with respect to the disk;

a correction value acquiring unit configured to measure an eccentricity of the disk and to calculate a correction value for controlling the head to scan a virtual circular locus approximately matching the plurality of tracks;

a write unit configured to write the correction value only in a specific System Area (SA) track within a System Area (SA) that is non-accessible by a user by supplying the correction value to the head, wherein at least one of the plurality of tracks does not include the correction value written thereon; and a control unit configured to control the head during a seek of any of the plurality of tracks, based on the correction value read from the specific System Area (SA) track, so that the head scans the virtual circular locus approximately matching the plurality of tracks.

20. The disk apparatus as claimed in claim 19, wherein the correction value corrects a first order component of the eccentricity other than high order components of the eccentricity.

21. The disk apparatus as claimed in claim 19 that is operable with a plurality of disks, wherein said write unit writes the correction value with respect to a cylinder that is formed by corresponding tracks of each of the plurality of disks.

22. The disk apparatus as claimed in claim 19, further comprising:

a unit configured to carry out a read and/or a write to read and/or write information with respect to the System Area (SA) track, on the virtual circular locus.

23. A disk apparatus operable with a disk which is formed with a plurality of tracks and is recorded with servo information including position information in servo frames by another disk apparatus, comprising:

a head configured to read and write information with respect to the disk; and a control unit configured to control the head during a seek of any of the plurality of tracks, based on a correction value that is for controlling the head to scan a virtual circular locus approximately matching the plurality of tracks which have been formed on the disk and is read from a specific servo frame of only a specific track on the disk, so that the head scans the virtual circular locus approximately matching the plurality of tracks which have been formed on the disk.

24. A disk apparatus operable with a disk which is formed with a plurality of tracks and is recorded with servo information including position information in servo frames by another disk apparatus, comprising:

a head configured to read and write information with respect to the disk; and a control unit configured to control the head during a seek of any of the plurality of tracks, based on a correction value that is for controlling the head to scan a virtual circular locus approximately matching the plurality of tracks which have been formed on the disk and is read from only a specific System Area (SA) track on the disk, so that the head scans the virtual circular locus approximately matching the plurality of tracks which have been formed on the disk, wherein the specific System Area (SA) track is within a System Area (SA) that is provided on the disk and is non-accessible by a user.

* * * * *

UNITED STATES PATENT AND TRADEMARK OFFICE
CERTIFICATE OF CORRECTION

PATENT NO. : 7,333,287 B2 Page 1 of 1
APPLICATION NO. : 10/963073
DATED : February 19, 2008
INVENTOR(S) : Takeshi Hara It is certified that error appears in the above-identified patent and that said Letters Patent is hereby corrected as shown below:

<u>In the Claims</u>:

Col. 16, line 56, delete "System, Area" and insert --System Area--.

Signed and Sealed this

Fifth Day of August, 2008

JON W. DUDAS
*Director of the United States Patent and Trademark Office*